UNITED STATES PATENT OFFICE.

MARC LAFFONT, OF PARIS, FRANCE.

ARTIFICIAL STONE.

SPECIFICATION forming part of Letters Patent No. 501,889, dated July 18, 1893.

Application filed May 15, 1893. Serial No. 474,323. (No specimens.) Patented in France November 28, 1891, No. 217,727; in England June 2, 1892, No. 10,532, and in Canada June 14, 1892, No. 39,148.

*To all whom it may concern:*

Be it known that I, MARC LAFFONT, a citizen of the French Republic, residing at Paris, France, have invented a new and useful Improvement in Artificial Stone, which improvement is fully set forth in the following specification, and for which Letters Patent have been granted to me in France, No. 217,727, dated November 28, 1891; in Canada, No. 39,148, dated June 14, 1892, and in Great Britain, No. 10,532, dated June 2, 1892.

The present invention relates to the production of artificial stone for various industrial uses, and consists specifically of a composition having the appearance and desirable properties of igneous or eruptive rocks formed by combining plastic refractory (apyrous) argil with the dust or débris of aqueous or sedimentary rocks, the mixture being converted into a homogeneous refractory body by the application of a definite degree of heat, to wit, 1,250° centigrade or over.

In my application filed April 13, 1892, Serial No. 429,067, I have described and claimed the process or operation by which the general products (of which the subject-matter of the present application is one species) are produced.

The principal steps of the process are as follows: The plastic refractory (apyrous) argil and the fusible ingredient, both in a state of powder are thoroughly mixed, moistened, kneaded, molded to the desired shape, dried, and heated gradually in a suitable furnace to a temperature beyond 1,250° centigrade (preferably to 1,400° centigrade) after which the product, which is a true artificial stone as distinguished from concretes or stones of the cement class, or from ordinary ceramic products, is slowly cooled.

This process is followed in making the particular product which constitutes the present invention. I use plastic refractory argil, as free as possible from foreign substances, (lime, magnesia, iron oxides, &c.) With this plastic refractory element I mix, as the fusible ingredient, the dust or débris of sedimentary (aqueous) rocks; as for example, quartz, sandstone, slaty schists. In this mixture I employ a minimum of fifteen per cent. of the plastic ingredient. The resulting product is distinguished by the same refractory property, hardness, crystalline and homogeneous structure, and sharp, regular fracture, which characterize all the products to which the generic name of "pyrosilex" is given.

I claim as my invention—

A homogeneous crystalline body composed of plastic refractory (apyrous) argil and sedimentary (aqueous) rocks or the dust or débris of the same, the mixture containing a minimum of fifteen per cent. of the plastic ingredient, and having the properties herein set forth.

In testimony whereof I have signed this specification in the presence of two subscribing witnesses.

MARC LAFFONT.

Witnesses:
JOSEPH L. LEVY,
B. S. WISE.